Feb. 10, 1959 — C. L. TANNER — 2,873,132
FLUID PRESSURE SEAL RING
Filed April 23, 1954

INVENTOR
CHARLES L. TANNER
BY
*Mason & Graham*

ATTORNEYS

United States Patent Office 2,873,132
Patented Feb. 10, 1959

2,873,132

FLUID PRESSURE SEAL RING

Charles L. Tanner, Los Angeles, Calif., assignor to Tanner Engineering Co., Los Angeles, Calif., a co-partnership Application April 23, 1954, Serial No. 425,089

2 Claims. (Cl. 288—19)

This invention has to do with seal rings for effecting a fluid pressure seal between two relatively movable cylindrical elements of a fluid pressure mechanism, one of which elements has an annular seal ring groove. This application is a continuation in part of my co-pending application, Serial No. 296,272, filed June 30, 1952, now abandoned.

The seal ring which has been most universally used for effecting a fluid pressure seal between two relatively movable elements, such as between a piston and its cylinder, is what is known as the O-ring. However, such O-rings have some disadvantages, particularly where the ring is subjected to great differentials of pressure on its respective sides. One of those disadvantages is that the parts between which the ring is placed must be machined to extremely close tolerances to prevent failures. Another of those disadvantages has been that the friction to which they are subjected in use causes them to become distorted in a manner which results in seal failure. Another of those disadvantages has been that such O-rings must be carefully molded to insure absolutely uniform cross-sectional shape and smooth exterior surfaces and this entails the necessity of removing all of the flash particles which tend to remain upon the ring as it is removed from the mold. Another disadvantage of the O-ring is that it tends to rotate and twist in use so that it becomes distorted into a shape which causes it to fail to seal.

While packing rings which have a substantially X-shape in cross section have been proposed, those rings have been unsuccessful as fluid pressure seal rings which are subjected to heavy fluid pressure because their parts, in cross section, have been so relatively proportioned and defined that they tend to fold or bend, instead of flowing, when subjected to substantial fluid pressure in an axial direction. This causes the rings to so elongate in cross section as to bind, which results in rapid destruction of the ring. For those reasons, the so-called X-rings, of which I am aware, have all been confined to use merely as packings to prevent leakage of oil between two relatively rotatable parts such as a shaft and its journal.

It is an object of my invention to provide a seal ring which, principally because of its critical cross-sectional shape and proportions, overcomes those disadvantages of conventional O-rings and conventional X-rings. That is, it is among the objects of my invention to provide a seal ring whose utility principally flows from its novel cross-sectional shape; in which the material of which it is composed flows into sealing relationship between the parts when subjected axially to fluid pressure; which is so shaped that the presence of a reasonable amount of flash which might be left thereon from the molding operation does not seriously interfere with the effectiveness of the ring as a seal; which is capable of being installed with greater dimensional tolerances than prior rings; which is so shaped and proportioned in cross section that it effects a seal without binding or exerting undue friction or without rolling or twisting; and which is capable of relatively longer life in use than other types of rings.

Other objects and advantages of my invention will appear hereinafter.

Without intending thereby to limit the broader scope of my invention, except as may appear from the appended claims, I shall now describe a presently preferred embodiment thereof, for which purpose I shall refer to the accompanying drawings wherein:

Figure 3:
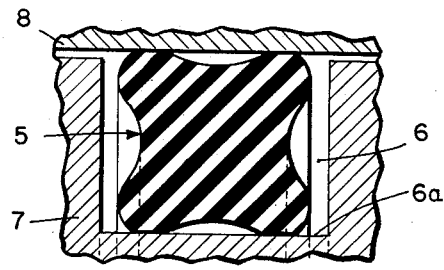
Figure 4:
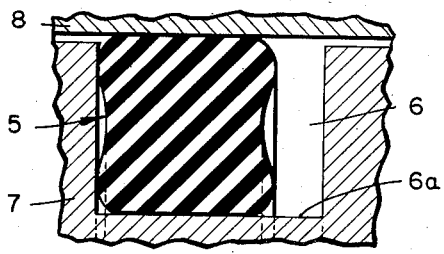
Figure 5:
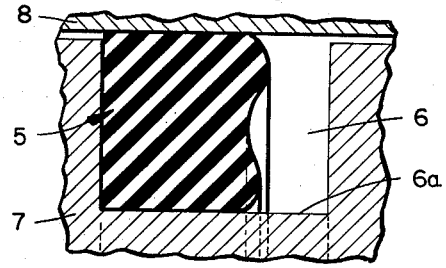
Figure 6:
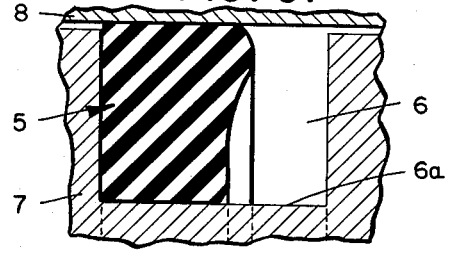

Figs. 3, 4, 5 and 6 are sectional views showing, respectively, my ring in use as a seal member between two relatively movable elements of a fluid pressure mechanism, the several views showing, in Fig. 3, how my ring appears in cross section before being subjected to fluid pressure, and being shown in Figs. 4, 5 and 6, respectively, in the shape which it assumes under progressive stages of pressure.

Referring now to the accompanying drawing, my seal, which is generally designated by the numeral 5, is annular in plan, is composed of a single, solid mass of material which is resilient, flexible, compressible and has the same degree of resiliency and compressibility throughout. Suitable materials for the purpose are the synthetic rubbers, natural rubber, plastics and any rubber-like material having the above-mentioned characteristics.

The ring is shown in Figs. 3–6 as being mounted in the ring groove 6 of a piston 7 reciprocally mounted in a cylinder 8. The bottom wall 6a of the annular ring groove is parallel with the longitudinal axis of the piston and the piston is shown as fitting the cylinder with considerable tolerance. Also, it is important that the thickness of the ring in relation to the distance between the bottom of the ring groove and the opposite inner surface of the cylinder be such that the ring, even when not subjected to fluid pressure, has an interference fit between those parts—that is, a fit which causes the ring to be initially somewhat compressed.

The ring, in cross section, has a main body portion 10 and four equidistantly spaced, bulbous corner portions 14 separated by equidistantly spaced, intervening side surfaces 16. The bulbous corner portions 14 present convexly curved surfaces 15 and the side surfaces 16 are concavedly curved.

My seal ring possesses certain critical proportions and it is essential that its cross-sectional exterior be defined entirely by curved surfaces which possess certain critical relationships now to be described. That is, it is essential that the body portion 10 possess a substantially greater cross-sectional thickness than the thickness of the respective bulbous corners 14 and that the radial length and thickness of the corners 14 be such as to prevent the corners from swinging or folding into such a position as to unduly elongate the ring in cross section when subjected axially to substantial fluid pressure.

Those critical relative proportions are produced by having the cross-sectional exterior of the ring defined by a series of tangentially merging, reversely curved, alternate side and corner surface portions of the following relatively radii and extent. Each of the corner portions 14 must be defined by a convexed surface curved not greater than 180° between the points at which its convex curve merges with the concaved curves of the two contiguous side surfaces 16, and about a radius not greater than approximately one-half the radius of curvature of each of the side surfaces 16; and each of the side surfaces 16 must be concavedly curved about a radius not less than approximately one-third of the cross-sectional thickness of the ring as defined by a straight line extending between the points denoted $x$—$x$ in Fig. 2. When I use the term "approximately" in prescribing the curvatures, I mean that they should not vary more than twenty percent from the limits stated.

Figure 1:
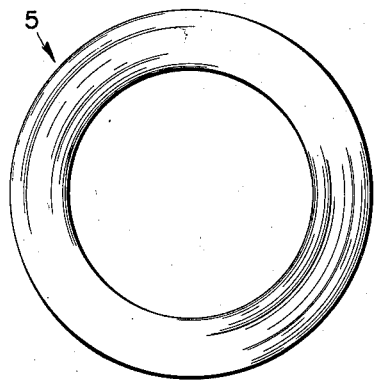
Fig. 1 is a plan view.
Figure 2:
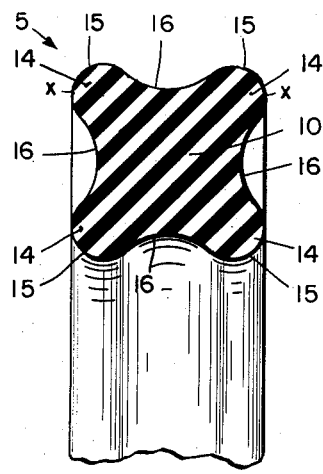
Fig. 2 is an enlarged cross-sectional view.

More specifically, as the proportions are best shown in Fig. 2, the radius of each convexed or bulbous corner portion 14 is substantially one-half the radius of each of the concaved portions 16, resulting in the major cross-sectional thickness, as measured between the crests of diagonally opposite corner portions 14, being not substantially more than one-third greater than the minor cross-sectional thickness of the body, measured between the centers of diametrically opposite concaved portions 16.

By those relative portions and curvatures the material of the ring will flow into sealing relationship between the parts instead of the corners folding or bending together.

As shown in Fig. 3, the initial fit of the ring between the bottom of the groove 6a and the inner surface of the cylinder 8 is an interference fit wherein the diametrically opposed pairs of corners are slightly compressed, although the interference fit should not be such that said corners will be compressed sufficiently to eliminate any space between the medial inner side surface of the ring and the bottom of the groove and the outer side surface of the ring and the inner surface of the cylinder. In Fig. 4 the ring is shown in the position and shape which it assumes when subjected axially to a fluid pressure of say less than 50 lbs. per sq. inch. In this position it will be observed that there has been only a slight flow of the material. In the position of Fig. 5 the ring is shown in the position and shape which it assumes when subjected to a substantially greater pressure say up to 500 lbs. per sq. inch. In this position the material of the ring will flow until the ring is flattened on three sides. In Fig. 6 the ring is shown in the position and shape which it assumes when subjected to an even greater fluid pressure of up to say 1500 lbs. per sq. inch.

I have found that even though a reasonable amount of flash particles might remain on the exterior side surfaces of the ring, it does not seriously interfere with its sealing effectiveness.

I claim:

1. A pressure seal ring comprising a one piece annular body of generally X-shaped cross-section, said body being composed of uniformly resilient, flowable, rubber-like material and, when considered in cross-section, having its outer surface defined by semicircular convexly curved, circumferentially extending corner lobe portions and intervening, circumferentially extending, concavedly curved surface portions each tangentially merging with the contiguous lobe portions; the radius of each of said lobe portions being substantially one half the radius of each of said concavedly curved surface portions.

2. A pressure seal ring for use in bridging the gap between two nested annular members in which the inner member has an annular peripheral groove for seating the ring, the groove having a larger axial dimension than the ring, said pressure seal ring comprising a one piece annular body composed of uniformly resilient, flowable, rubber-like material and, when considered in cross-section, being symmetrical in shape and having its outer surface defined by semi-circular convexly curved, circumferentially extending corner lobe portions and intervening, circumferentially extending concavedly curved surface portions each tangentially merging with the contiguous lobe portions; the radius of each of said lobe portions being substantially one half the radius of each of said concavedly curved surface portions.

References Cited in the file of this patent

UNITED STATES PATENTS

| 511,734 | Hoffstadt | Dec. 26, 1893 |
| 1,770,193 | Bragg et al. | July 8, 1930 |
| 2,394,364 | Christensen | Feb. 5, 1946 |
| 2,700,561 | Svenson | Jan. 25, 1955 |

FOREIGN PATENTS

| 173,852 | Germany | Sept. 13, 1905 |